(No Model.)
P. LANGE.
GALVANOMETER.
No. 386,993. Patented July 31, 1888.
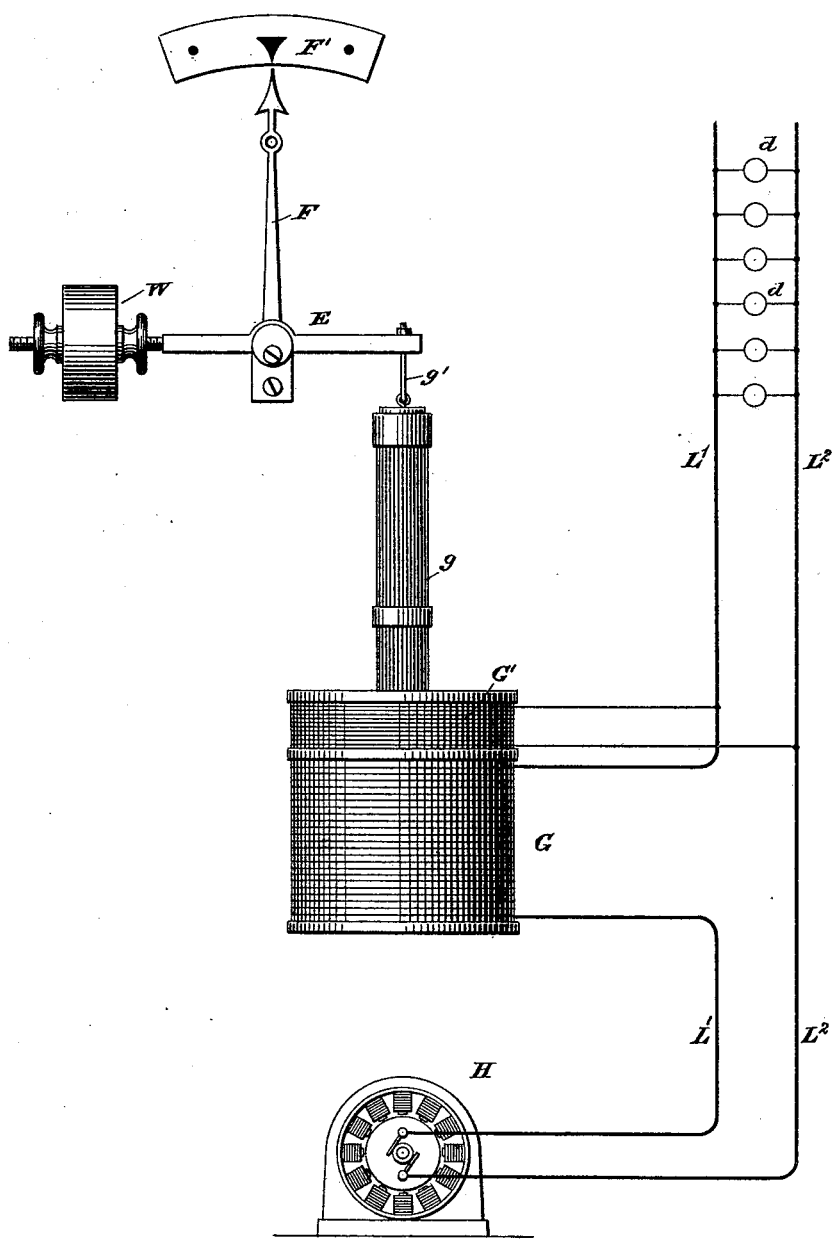
Witnesses
Geo. W. Breck.
Edward Thorpe.
Inventor,
Philip Lange,
By his Attorneys
Pope Edgecomb & Terry.

UNITED STATES PATENT OFFICE.

PHILIP LANGE, OF PITTSBURG, PENNSYLVANIA, ASSIGNOR TO THE WESTINGHOUSE ELECTRIC COMPANY, OF SAME PLACE.

GALVANOMETER.

SPECIFICATION forming part of Letters Patent No. 386,993, dated July 31, 1888.

Application filed January 21, 1888. Serial No. 261,439. (No model.)

*To all whom it may concern:*

Be it known that I, PHILIP LANGE, a citizen of the United States, residing in Pittsburg, in the county of Allegheny, in the State of Pennsylvania, have invented certain new and useful Improvements in Galvanometers, (Case 204,) of which the following is a specification.

The invention relates to the construction of electric meters for indicating or measuring the electricity used for operating translating devices or traversing any given circuit.

The object of the invention is to provide a convenient device which will respond to variations in the quantity of current traversing a given conductor, and which will be accurate in its movements whether the amount of current flowing be large or small.

The invention consists in connecting in series with the translating or current-consuming devices a coil or solenoid of such size and conductivity as to readily convey the entire current. This solenoid is provided with a core, preferably composed of soft-iron wires electrically insulated from each other. The core is free to move axially into and out of the coil under the influence of currents traversing the same. For the purpose, however, of effectively polarizing the core at all times, so that no appreciable portion of the current traversing the series-coil will be needed to give it initial magnetism, a second or auxiliary coil is employed. This independent coil also surrounds the core and is inserted in a shunt bridging the translating or current-consuming devices, and it therefore receives a current which is approximately constant under all conditions.

The movements of the core may be employed to operate an indicating device in any convenient manner.

In the accompanying drawing there is shown in diagram a general organization of circuits and apparatus illustrating the invention.

Referring to the figure, H represents a suitable source of electric currents, which may be alternating or continuous in direction. Conductors L' and L² lead from the respective poles of this source, and serve to operate translating devices such as are indicated at *d d*. These devices are shown as being connected in parallel, although other arrangements may be employed, if desirable.

In the conductor L', in series with the devices *d*, is connected a magnetizing coil or solenoid, G. This solenoid is composed of a conductor of sufficient conductivity to convey the entire current required to supply the devices *d*. A core, *g*, extends within the coil G, which core may be composed of insulated strips, plates, laminæ, or wires of soft iron. It is preferably made of insulated wires, in the manner described in a patent issued to me, No. 366,408. The core *g* is suspended by means of a link, *g'*, or in any other convenient manner, from a pivoted beam, E. This beam carries a pointer or indicator, F, which by its position with reference to a scale-plate, F', serves to indicate the current traversing the coil G.

For the purpose of balancing the weight of the core to such extent as may be necessary, an adjustable weight, W, may be carried upon the beam E.

In order that a certain magnetization shall at all times be given to the core *g*, a shunt-coil, G', is employed in addition to the coil G. This coil G' is connected between the conductors L' and L² in shunt upon the devices *d*, and it therefore receives a current at all times. This current is approximately constant, since the difference of potential upon the two conductors is maintained constant, or nearly so. The coil G', it is evident, may be connected between any points in the circuit having a constant difference of potential. The core *g*, which extends within this coil, will thus receive a certain amount of magnetism by reason of this coil at all times. The connections and direction of winding are such that the magnetism induced in the core *g* thereby is in the same direction as that induced by currents traversing the coil G. Preferably the coil G' is located between the coil G and the point of support of the core *g*, or upon that side of the coil G from which the core is withdrawn, so that it will always surround the core, whatever be the position of the latter with reference to the coil G.

The device is especially useful in measuring or indicating alternate electric currents; but it may be used in connection with direct electric currents.

I claim as my invention—

1. In an electric meter, two independent fixed assisting-coils, one adapted to be connected in series with the work-circuit and the other in shunt therefrom, and a core movable with reference to both coils, substantially as described.

2. The combination, in an electric meter, of a movable core, a solenoid for actuating the same, designed to be connected in series with the work-circuit, and a second solenoid applied to said core and designed to be connected in shunt upon the work-circuit, said second solenoid having a fixed position with reference to the series-coil.

3. In an electric meter, the combination, with a coil connected in series with the work-circuit and a core acted upon thereby and movable into and out of the coil, of a second solenoid connected in shunt upon the work-circuit and fixed upon the end of the first-named solenoid at which the core enters.

4. In an electric meter, two independent fixed solenoids acting in the same magnetic sense upon a core common to both and movable with reference thereto, one of which solenoids is traversed by a current dependent upon the consumption in the work-circuit, and the other by a current approximately constant under all conditions.

In testimony whereof I have hereunto subscribed my name this 3d day of January, A. D. 1888.

PHILIP LANGE.

Witnesses:
J. N. COOKE,
DANL. W. EDGECOMB.